April 15, 1958        A. BURI        2,830,785
PILOT CONTROLLED VALVE WITH FOLLOW-UP MECHANISM
Filed March 25, 1955
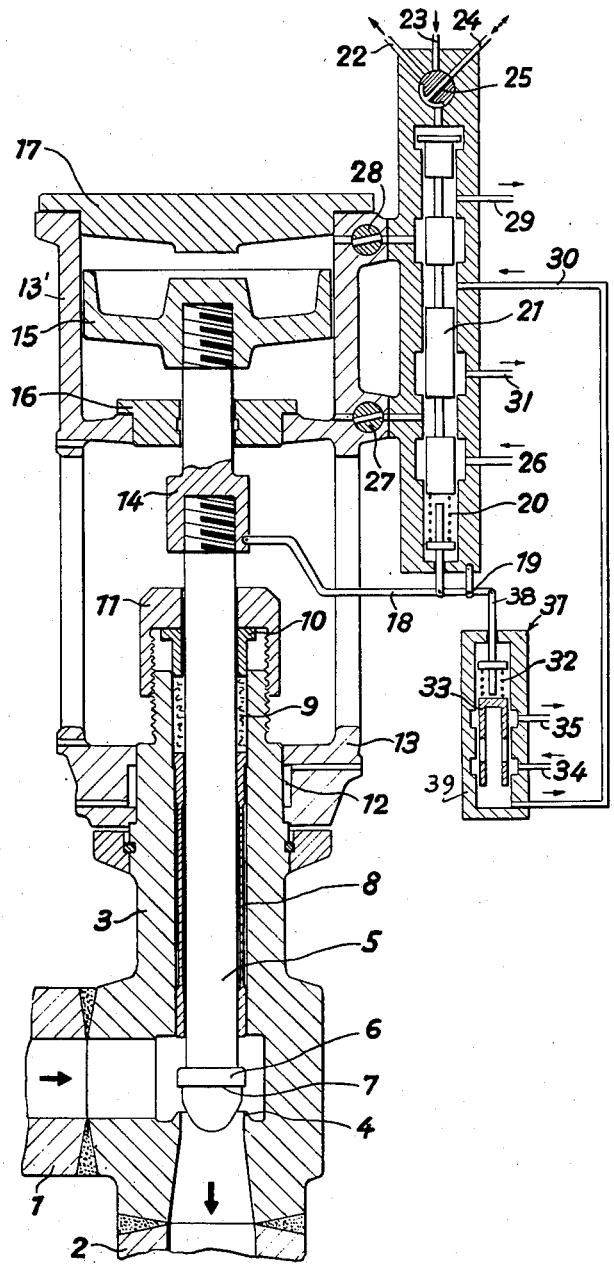
INVENTOR.
ALFRED BURI.
BY
ATTORNEY.

United States Patent Office 2,830,785
Patented Apr. 15, 1958

2,830,785
PILOT CONTROLLED VALVE WITH FOLLOW-UP MECHANISM

Alfred Buri, Winterthur, Switzerland, assignor to Sulzer Freres, Societe Anonyme, Winterthur, Switzerland, a corporation of Switzerland Application March 25, 1955, Serial No. 496,713

Claims priority, application Switzerland April 6, 1954

1 Claim. (Cl. 251—29)

The present invention relates to a method for actuating a flow control means which is particularly suitable for controlling the flow of fluids of a pressure higher than 3200 p. s. i. and whose temperature is above 932° F., the control means including a valve which closes in the direction of the flow of the fluid through the valve and whose valve spindle extends through the inlet chamber of the valve. The present invention also refers to a flow control means suitable for performing the aforesaid method.

Valves as specified above can be held open solely by the pressure of the fluid flowing through the valve, for example steam. The valve spindle relieves the valve member supported by the spindle of the pressure acting on one side of the valve member, the total cross sectional area of the valve member being exposed to the fluid pressure on the other side of the valve member. It is therefore necessary to exert pressure on the valve spindle for closing the valve. The valve can be held in closed position solely by the pressure of the fluid acting on the valve member since the inlet pressure acts solely on the area of the valve member which area projects beyond the cross section of the valve spindle, when the valve is in closed position. In conventional arrangements, a closing pressure is exerted on the valve spindle, for example, by means of a servomotor until the valve member is seated on the valve seat, the pressure being usually maintained so long as the valve is closed. At supercritical pressures and at temperatures above 932° F., the valve seat to which the valve member is pressed by the fluid whose flow is controlled by the valve is stressed almost to its hot-yield point by the pressure of the fluid alone. If, in addition to the fluid pressure, pressure is applied by the servomotor, the material of the valve seat is plastically deformed. The stuffing box friction is considerable in valves for high pressure fluids, particularly because the spindles of such valves have a considerable diameter and are subject to heat expansion, necessitating the use of soft packings. Therefore, the servomotor must be designed to produce a greater power for closing the valve than is needed to overcome the fluid pressure alone. The closing force acting on the valve spindle may be twice or three times as great as is required to overcome the fluid pressure and is so great as to completely destroy the valve seat.

It is an object of the present invention to provide a method for closing valves for controlling the flow of high pressure and high temperature fluids which method protects the valve seat against excessive pressures by reducing by a specially provided regulating step the power acting on the valve spindle when the valve member approaches the valve seat. With the method according to the invention the valve member is pressed to the valve seat by a force which is not greater than the fluid pressure acting on the valve. The valve seat can be so dimensioned that its material is not overstressed.

In the system according to the invention the force acting on the valve spindle may be adjusted in accordance with the position of the valve spindle. If the servomotor is of the hydraulic type having a piston actuated by oil under pressure, the force acting on the valve spindle can be controlled according to the pressure conditions on the two sides of the piston. Upon preponderance of the fluid pressure acting on the valve member in the closing direction, the pressure of the oil which must be displaced by the servomotor piston is increased so that the ratio of the pressure acting on the opposed sides of the piston is changed.

The force exerted by the servomotor on the valve spindle is preferably gradually reduced to its minimum value. In this way all parts of the mechanism are well protected and the control motions are smooth.

For reducing the force acting on the valve spindle preferably at least a part of the power supplied to the servomotor for closing the valve is reduced. This can be accomplished in a hydraulic servomotor by reducing the oil pressure acting on the servomotor piston in the valve closing direction. If an electric servomotor is used, the pressure reduction may be effected by controlling the electric tension or the current. The power acting on the valve spindle may also be reduced by applying a counterforce to the valve spindle, for example by increasing the pressure on the side of the servomotor piston which is opposed to the side on which the pressure acts for closing the valve. The oil displaced by the servomotor piston moving in the direction for closing the valve may be throttled so that the closing movement is retarded and a braking effect is produced when the valve member approaches the valve seat.

Preferably a control mechanism is used which reduces the force exerted by the servomotor on the valve spindle before the valve member reaches the valve seat. For this purpose the servomotor may be provided with a pressure oil actuated slide valve for controlling the admission to and the relief of oil from the cylinder in which the servomotor piston is reciprocable and a supplemental control device may be arranged in the conduit for supplying pressure oil to the interior of the servomotor cylinder on the side of the piston where the pressure causes closing of the valve for controlling the pressure of the oil admitted to the cylinder. The method according to the invention thus requires merely the addition of the aforesaid control device to an otherwise conventional servomotor arrangement. An additional device may be provided for throttling the oil flow in the conduit for the oil which is discharged from the piston cylinder upon closing of the high pressure, high temperature fluid valve.

If the cross sectional area of the valve spindle is about half as great as the area within a circle inscribed in the middle of the annular valve seat, the power to be provided by the servomotor is about the same for closing as for opening the valve. The outer diameter of the valve member is preferably about one-and-one-half times the diameter of the valve spindle supporting the valve member. The valve spindle may be guided in a bushing whose outer diameter is greater than that of the valve member. This makes it possible to conveniently withdraw the valve spindle with the valve member from the valve body and no special cover need be provided on the latter.

The valve member is preferably provided with a portion extending through the base of the valve seat into the outlet chamber of the valve body for throttling the fluid flow through the valve before the valve member is seated on the valve seat. Such valve members have been used hitherto to displace the throttling action away from the valve seat. If this construction of the valve member is used in combination with the other features of the present invention, there is the additional advantage that the stroke and the time elapsing between beginning of the throttling effect and complete closing of the valve can be used for the control operation. For example, one may allow the valve to close at full force and speed until only a fraction of the original flow area is open and one may subsequently reduce the force exerted by the servomotor on the valve spindle so that the fluid pressure acting only on one side of the valve member overcomes the stuffing box friction and closes the valve slowly.

The novel features which are considered characteristic of the invention are set forth with particularity in the appended claim. The invention itself however and additional objects and advantages thereof will best be understood from the following description of an embodiment thereof when read in conjunction with the accompanying drawing, in which the one figure is a diagrammatic longitudinal section of a flow control means according to the invention.

Referring more particularly to the drawing, numeral 3 designates a valve body which is interposed between and welded to a high pressure inlet tube 1 and an outlet tube 2, the interior of the valve body being provided with a valve seat 4. A valve spindle 5 supports a valve member 6 having a seating surface portion 7. The valve spindle 5 is guided in a bushing 8 and is sealed from the outside by means of a soft packing 9 which is held in an annular space surrounding the valve spindle by means of a bushing 10 and a screw cap 11. For cooling the stuffing box, a coolant may be conducted through an annular chamber 12 surrounding the valve body 3 adjacent to the stuffing box and formed by a superstructure 13 which is mounted on the valve body. The valve spindle 5 is connected with a piston 15 of a pressure oil actuated servomotor by means of a coupling member 14. The piston is reciprocated in a cylinder 13' forming the upper part of the superstructure 13, the ends of the cylinder being closed by covers 16 and 17. If the two covers 16 and 17 and the screw cap 11 are moved, the valve spindle 5 together with the bushing 8 and other parts connected with the spindle can be conveniently withdrawn in upward direction.

A lever 18 swinging on a pivot 19 is pivoted to the coupling member 14. One arm of the lever 18 acts on a spring 20 abutting one end of a control slide valve member 21. The slide valve member 21 can be moved against the action of the spring 20 by pressure oil flowing through control conduits 22, 23, or 24, depending on the position of a rotatable valve 25. If the valve member 21 is forced down against the action of the spring 20, pressure oil is admitted through a conduit 26 and a valve 27 into the space in the cylinder 13' below the piston 15, so that the main valve 3, 4, 5 is opened, the oil above the piston 15 being discharged through a valve 28 and a conduit 29. Upon upward movement of the piston 15 and of the valve spindle 5, the lever 18 compresses the coil spring 20, returning the valve member 21 to its original neutral position. If the valve member 21 is moved upward, pressure oil flows through a supply conduit 30 into the cylinder 13' at the side of the piston 15 where the pressure causes closing of the main valve, pressure oil being discharged from the cylinder at the opposite side of the piston 15 through a discharge conduit 31. The lever 18 constitutes a conventional return mechanism. With the described control mechanism, each position of the main valve corresponds to a certain pressure in the control conduits 22, 23, or 24.

It is an important feature of the present invention that, in addition to the usual servomotor control mechanism 21 to 25, an apparatus is provided for controlling the oil pressure in the supply conduit 30 and consequently the oil pressure within the cylinder 13' on the side of the piston 15 where the pressure causes closing of the valve.

The additional apparatus includes a control valve 37 interposed in the conduit 30 for changing the oil pressure in the conduit 30 upon lifting of the control valve member 21 to effect closing of the main valve. The additional mechanism includes a member 38 which is pivoted to the far end of the lever 18 and which is adapted to release a spring 32 upon movement of the valve spindle 5 in the closing direction. The spring 32 rests on a control valve member 33 which is slidable in a valve housing 39. The member 33 is moved upward by the pressure of the oil entering the housing 39 through a conduit 34, if the member 38 moves upward and the spring 32 is released. Upward movement of the piston 33 interrupts the flow of pressure fluid into the housing 39 through the conduit 34 and opens a discharge conduit 35, so that the oil pressure in the conduit and above the piston 15 is reduced. The pressure on top of the piston 15 and consequently the force acting on the valve spindle 5 for closing the valve is a function of the position of the valve spindle. For safety reasons, it is advisable to prevent lowering of the oil pressure on top of the piston 15 to atmospheric pressure and to maintain a predetermined minimum pressure above the piston 15 at all times.

The valves 27 and 28 are usually provided for closing off the servomotor cylinder, if the control slide valve 21 is removed, for example for making repairs. The valve 27 may be used as an adjustable throttle so that the amount of oil discharged from the space in the cylinder 13' below the piston 15 is reduced, causing a braking effect on the closing movement of the main valve.

In valves for controlling the flow of a high pressure and high temperature fluid, the diameter of the valve spindle is rather great relatively to the diameter of the valve member and of the valve seat. This causes favorable pressure conditions which facilitate the construction of the servomotor.

The flow control means shown in the drawing is just one example for illustrating the invention. The mechanism may be modified in many ways without departing from the scope of the present invention. The position of the flow control means has no bearing on the functioning of the method and apparatus according to the invention. The mechanism shown in the drawing may be turned upside down, so that the valve closes in upward direction without interfering with the desired functioning of the device.

What is claimed is:

A flow control means comprising a valve for closing a conduit, particularly a conduit in which steam of a pressure higher than 3200 p. s. i. and of a temperature exceeding 932° F. is conducted, said valve including a valve body provided with a bushing, a valve spindle axially guided in said bushing, a valve member at one end of said spindle, a valve seat in said body adapted to receive said valve member for closing the valve upon axial movement of said spindle towards said seat, said valve having an inlet terminating in said valve body at the side of said valve member where said spindle extends from said valve member, said valve having an outlet coaxially of said spindle and terminating in said valve body opposite said valve member at the side thereof distal of said spindle, the pressure of the fluid passing through the valve tending to lift said valve member from its seat and the pressure of the fluid passing into said valve acting on a surface of the valve member equal in area to the area of said valve seat minus the cross section of said spindle holding said valve in closed position, a servomotor connected with said spindle for moving said spindle towards and from said seat against the action of the fluid passing through and into said valve, a first mechanism for controlling the flow of an actuating fluid into and from said servomotor, follow-up means permanently connected with said valve spindle and being moved in proportion to the axial movements of the latter and being connected with said first mechanism for actuating said first mechanism in a direction to supply actuating fluid to said servomotor for opposing the movement of said servomotor and of said valve spindle effected by the pressure of the fluid passing through said valve, and a second mechanism for controlling the flow of supplemental actuating fluid to said first mechanism, said second mechanism being connected with said follow-up means for actuation thereby for additionally conducting actuating fluid to and from said servomotor for supplementally opposing the movement of said servomotor and of said valve spindle effected by the pressure of the fluid passing through said valve in proportion to the extent of the axial movement of said spindle.

References Cited in the file of this patent

UNITED STATES PATENTS

| | | |
|---|---|---|
| 1,319,463 | Doble | Oct. 21, 1919 |
| 1,726,726 | Wettstein | Sept. 3, 1929 |
| 1,897,350 | Weigner | Feb. 14, 1933 |
| 2,020,847 | Mitereff | Nov. 12, 1935 |